US012138231B1

(12) United States Patent
Chen

(10) Patent No.: US 12,138,231 B1
(45) Date of Patent: Nov. 12, 2024

(54) MOISTURE- AND DUST-PROOF LOCKABLE PRESS-TYPE SPRING COMPARTMENT PILLBOX

(71) Applicant: Qiang Chen, Putian (CN)

(72) Inventor: Qiang Chen, Putian (CN)

( * ) Notice: Subject to any disclaimer, the term of this patent is extended or adjusted under 35 U.S.C. 154(b) by 0 days.

(21) Appl. No.: 18/607,372

(22) Filed: Mar. 15, 2024

(30) Foreign Application Priority Data

Feb. 28, 2024 (CN) ........................ 202420369622.0

(51) Int. Cl.
*A61J 1/03* (2023.01)
*A61J 7/00* (2006.01)
*B65D 55/02* (2006.01)

(52) U.S. Cl.
CPC ............... *A61J 7/0084* (2013.01); *A61J 1/03* (2013.01); *B65D 55/02* (2013.01)

(58) Field of Classification Search
CPC .......... A61J 7/0084; A61J 1/03; A61J 7/0069; A61J 7/0076; A61J 7/04; B65D 55/02; B65D 83/0445
USPC .............................. 206/538, 528, 531, 534.1
See application file for complete search history.

(56) References Cited

U.S. PATENT DOCUMENTS 4,741,441 A * 5/1988 Keffeler .................... A61J 1/03 206/532
5,011,018 A * 4/1991 Keffeler ............. B65D 83/0445 206/532
5,267,650 A * 12/1993 Gilbilisco ................. A61J 7/04 206/815
5,735,406 A * 4/1998 Keffeler ............. B65D 83/0445 206/538
6,733,095 B1 * 5/2004 Rieb .......................... A61J 1/03 312/138.1
7,097,037 B1 * 8/2006 Keffeler ............. B65D 21/0202 206/532
7,494,012 B1 * 2/2009 Priebe ................ B65D 83/0445 206/538
7,793,785 B2 * 9/2010 Keffeler ..................... A61J 7/04 206/532
7,854,326 B1 * 12/2010 Beckett ................. A61J 7/0084 206/534

(Continued)

FOREIGN PATENT DOCUMENTS

CN 104027243 A 9/2014
CN 219565900 U 8/2023
CN 219814699 U 10/2023

*Primary Examiner* — Steven A. Reynolds
(74) *Attorney, Agent, or Firm* — Nitin Kaushik

(57) ABSTRACT

A moisture- and dust-proof lockable press-type spring compartment pillbox is provided. The pillbox includes an upper cover, a lower bottom provided below the upper cover, and a plurality of plastic drawers provided between the upper cover and the lower bottom. An upper end of each plastic drawer is provided with a silicone inner cover. The plastic drawer is slidably provided along an inner side of the lower bottom. A rear end of the plastic drawer is provided with a locking joint. A rear edge of the inner side of the lower bottom is provided with a plurality of lock assemblies that correspond one-to-one with the locking joints on the plurality of plastic drawers. The lock assembly includes a built-in lock pliers for clamping the locking joint when the plastic drawer is pushed into the lower bottom, so as to fix the plastic drawer to the lower bottom.

6 Claims, 6 Drawing Sheets

(56) References Cited

U.S. PATENT DOCUMENTS

| | | | | |
|---|---|---|---|---|
| 8,066,123 | B2 * | 11/2011 | Gelardi | B65D 83/0445 220/345.2 |
| 2003/0038053 | A1 * | 2/2003 | Bramen | B65D 83/0445 220/524 |
| 2010/0012547 | A1 * | 1/2010 | Gardner | B65D 83/0445 312/319.1 |
| 2014/0251862 | A1 * | 9/2014 | Priebe | A61J 1/03 206/534 |
| 2014/0360954 | A1 * | 12/2014 | Andrews | A61J 7/04 211/71.01 |
| 2023/0372205 | A1 * | 11/2023 | Bonilla | A61J 7/0454 |
| 2024/0109713 | A1 * | 4/2024 | Darst | A61J 7/0084 |

* cited by examiner

MOISTURE- AND DUST-PROOF LOCKABLE PRESS-TYPE SPRING COMPARTMENT PILLBOX

CROSS-REFERENCE TO RELATED APPLICATIONS

The application claims priority to Chinese patent application No. 202420369622.0, filed on Feb. 28, 2024, the entire contents of which are incorporated herein by reference.

TECHNICAL FIELD

This application relates to the technical field of plastic pillboxes, and in particular to a moisture- and dust-proof lockable press-type spring compartment pillbox.

BACKGROUND

The plastic pillbox is a container used for storing and packaging medicine and typically made of a plastic material. The plastic pillbox features appropriate sealing performance and moisture- and dust-proof functions, thus preserving the quality and safety of the medicine, and is of a reasonable compartmentalized structure to separate and store different types of medicines with various effects. This aids users in quickly selecting and taking the required medicine. However, the conventional plastic pillboxes lack practicality because their lock mechanisms typically require a finger joint to open. This is inconvenient for individuals with arthritis to use their finger joints to open the pillboxes for medicine, thus increasing the difficulty of medication taking. Therefore, the present invention provides a moisture- and dust-proof lockable press-type spring compartment pillbox, to resolve the foregoing problem.

SUMMARY

To resolve the problem in the prior art: The conventional plastic pillboxes lack practicality because their lock mechanisms typically require a finger joint to open, which is inconvenient for individuals with arthritis to use their finger joints to open the pillboxes for medicine, thus increasing the difficulty of medication taking.

This application provides the technical solution. A moisture- and dust-proof lockable press-type spring compartment pillbox is provided. The pillbox includes an upper cover, a lower bottom, and a plurality of plastic drawers. The lower bottom is provided below the upper cover, the plastic drawers are provided between the upper cover and the lower bottom. The plastic drawers are compartmentalized, and a baffle is provided between two adjacent plastic drawers. The plastic drawer is slidably provided along an inner side of the lower bottom. a rear end of the plastic drawer is provided with a locking joint. A rear edge of the inner side of the lower bottom is provided with a plurality of lock assemblies that correspond one-to-one with the locking joints on the plurality of plastic drawers. The lock assembly includes a built-in lock pliers, where the built-in lock pliers is configured to clamp the locking joint when the plastic drawer is pushed into the lower bottom, so as to fix the plastic drawer to the lower bottom.

Preferably, with the arrangement of the spring and a lock cylinder, during no use, the compartment pillbox is locked in a box, and the plastic drawer is sealed using the silicone inner cover, to provide anti-drop and dust-proof effects for the medicine to be stored, thus protecting the medicine from being damaged. During use, the plastic drawer only needs to be pressed to pop out automatically and is triggered for snap-fitting via a press, allowing for convenient opening and closing. In addition, the silicone inner cover is snap-fitted with and sealed with the plastic drawer via the snap-fit block. This can effectively prevent moisture from infiltrating into the pillbox, maintaining the dryness of the medicine, and preventing it from deteriorating, thus ensuring excellent moisture-resistant performance.

Preferably, an upper end of the plastic drawer is provided with a silicone inner cover, a rear end of the silicone inner cover is provided with a snap-fit block, the rear end of the plastic drawer is further provided with a snap-fit hole for accommodating the snap-fit block, and the silicone inner cover is snap-fitted with the plastic drawer via an engagement between the snap-fit block and the snap-fit hole. The snap-fitted sealing between the silicone inner cover and the plastic drawer can effectively prevent moisture from infiltrating into the plastic drawer, thereby maintaining the dryness of the medicine, and preventing it from deteriorating, thus ensuring excellent moisture-resistant performance.

Preferably, a front edge of the inner side of the lower bottom is provided with a plurality of protrusions. Each plastic drawer corresponds to two of the protrusions. A lower end of the plastic drawer is provided with a pair of the chutes for accommodating the protrusions corresponding to the plastic drawer. When the plastic drawer slides to a tail end of the lower bottom, the plastic drawer is blocked by corresponding protrusions in the lower bottom. The block design ensures compact sliding status between the lower bottom and the plastic drawer, preventing excessive sliding of the lower bottom from causing detachment, thus making the medicine taking convenient Preferably, the locking joint on the rear end of the plastic drawer is located below the snap-fit hole. The snap-fitted design of the built-in lock pliers ensures the plastic drawer is not opened or closed accidentally, preventing the medicine from being scattered or missing and the plastic drawer from detaching.

Preferably, the lock assembly further includes a built-in lock sleeve, a snap-fit case, a clasp machine bracket, and a spring. The built-in lock pliers is provided in the built-in lock sleeve. The snap-fit case sleeves the built-in lock pliers, the clasp machine bracket is disposed in the built-in lock pliers, the spring is disposed outside the clasp machine bracket in the built-in lock pliers, and an inner side of the spring is provided with spring damping. In the press-type spring compartment pillbox, with the arrangement of the spring and a lock cylinder (such as a combination of the built-in lock pliers and the clasp machine bracket), during no use, the plastic drawer is locked in a box formed by the upper cover, the lower bottom, and the baffle. The plastic drawer is sealed by the silicone inner cover, to provide anti-drop and dust-proof effects for the medicine to be stored, thus protecting the medicine from being damaged. During use, the plastic drawer only needs to be pressed to pop out automatically, resulting in simple operation and convenient use.

Preferably, an outer surface of the built-in lock sleeve is provided with a positioning slot, an inner wall of the upper cover is provided with a limit bracket that matches the positioning slot, and the built-in lock sleeve is snap-fitted with the upper cover via an engagement between the positioning slot and the limit bracket. The limit bracket being snap-fitted into the positioning slot avoids the built-in lock sleeve vibrating, ensuring the compact fitting between the built-in lock sleeve and the upper cover and preventing the built-in lock sleeve from detachment under an external force, thus enhancing the overall stability of the pillbox.

Preferably, a lower end of the upper cover is provided with a snap-fit plate, an upper end of the lower bottom is provided with a connecting slot for accommodating the snap-fit plate, the lower bottom is further provided with a fixed block located in the connecting slot, and the upper cover is snap-fitted with the lower bottom via an engagement between the snap-fit plate and the fixed block. The upper cover is connected to the snap-fit plate, and the fixed block in the slot is snap-fitted with the lower bottom, effectively preventing dust and impurities from entering the pillbox, thus maintaining the cleanliness of the medicine.

Reference signs in the accompanying drawings: 100, pillbox: 1, upper cover: 2, lower bottom: 3, plastic drawer: 4, silicone inner cover: 5, locking joint; 6, built-in lock sleeve; 7, snap-fit case: 8, built-in lock pliers: 9, clasp machine bracket: 10, spring: 11, limit bracket; and 12, protrusion: 13, baffle: 14, snap-fit block: 15, snap-fit hole; 16, chute; 21, tail end: 30, lock assembly: 61, positioning slot: 101, snap-fit plate: 201, connecting slot: 202, fixed block.

DETAILED DESCRIPTION OF THE EMBODIMENTS

This application is further described with reference to the accompanying drawings and embodiments.

Figure 1:
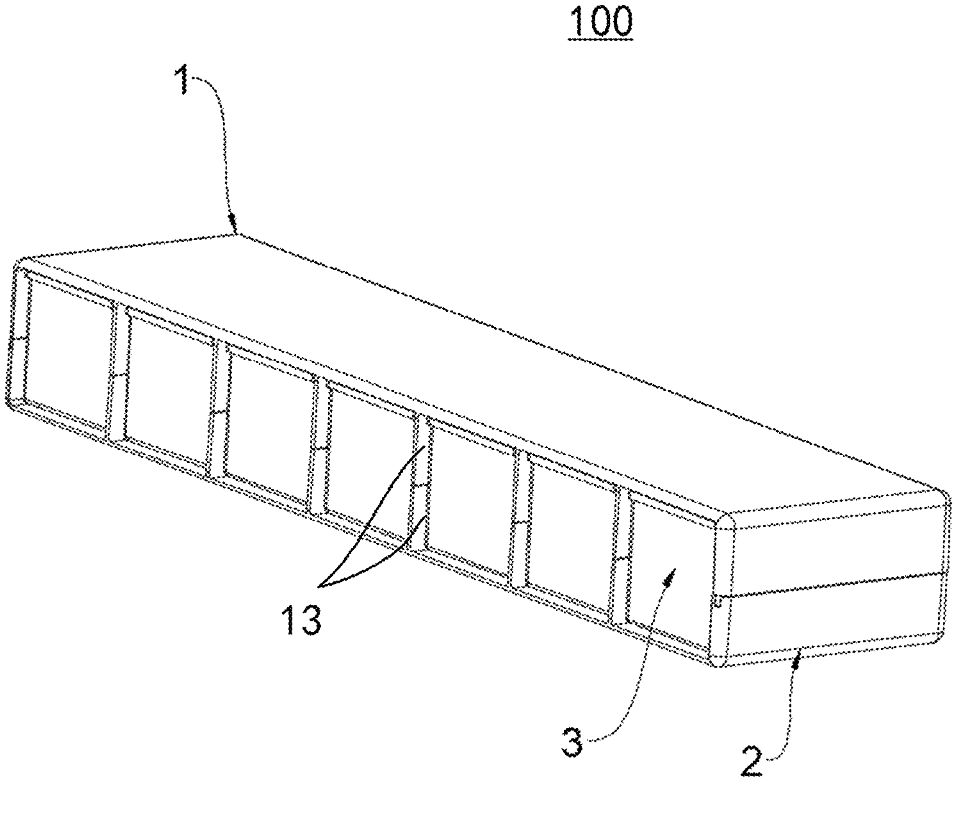
FIG. 1 is a schematic diagram of an entire structure according to this application.
Figure 2:
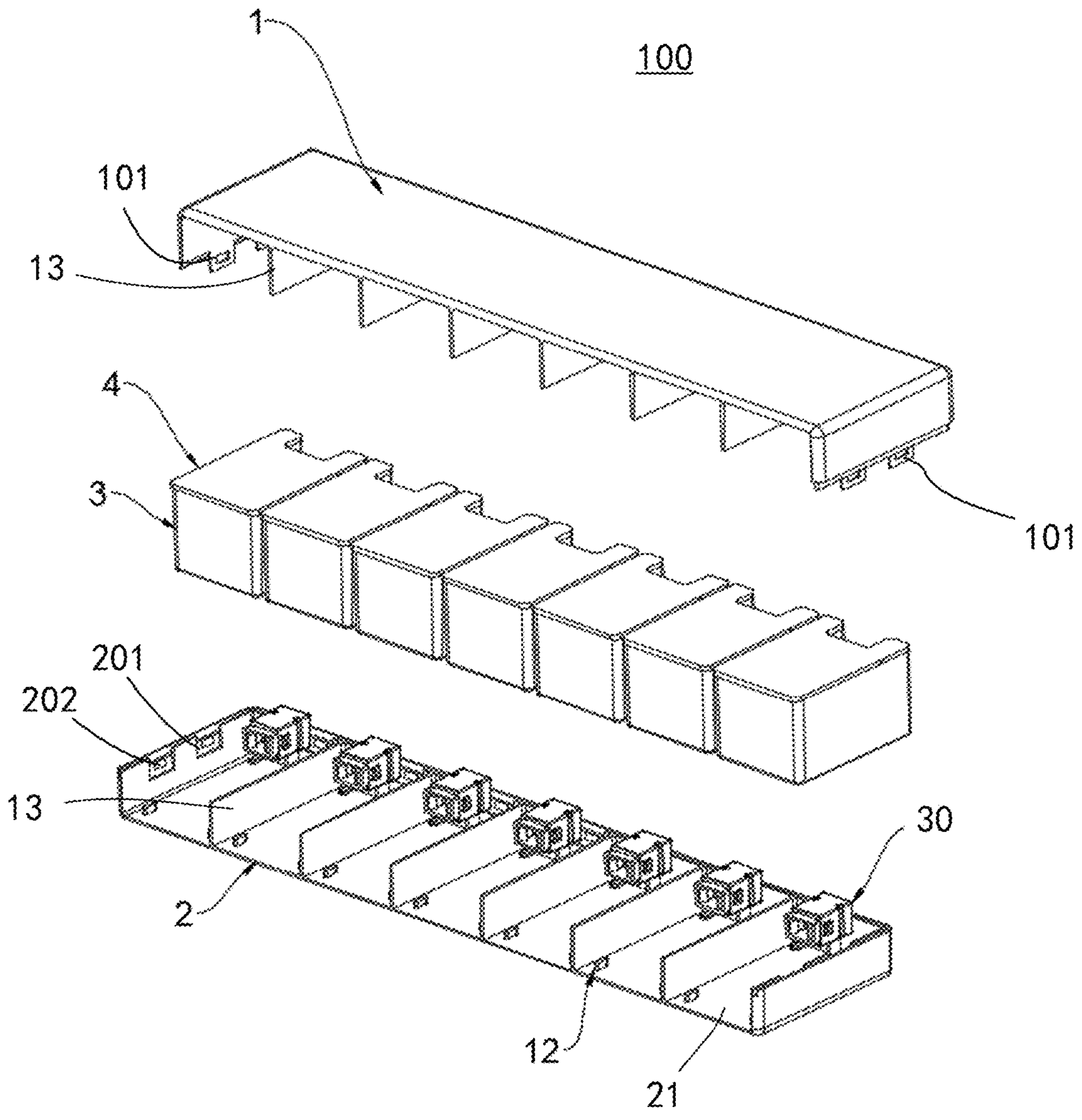
FIG. 2 is a schematic diagram of an exploded structure according to this application.

Referring to FIGS. 1 and 2, an embodiment of this application provides a moisture- and dust-proof lockable press-type spring compartment pillbox 100. The pillbox 100 includes an upper cover 1, a lower bottom 2, and a plurality of plastic drawers 3. The lower bottom 2 is below the upper cover 1, the plastic drawers 3 are provided between the upper cover 1 and the lower bottom 2, the plastic drawers 3 are compartmentalized, and a baffle 13 is provided between two adjacent plastic drawers 3.

Figure 4:
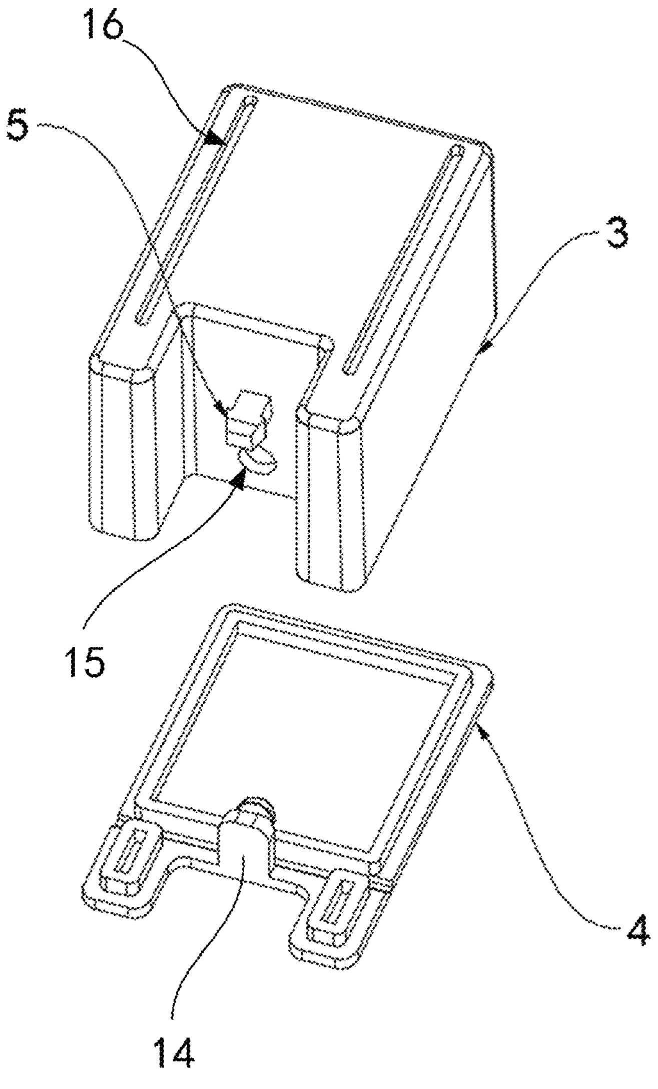
FIG. 4 is a schematic structural diagram of a plastic drawer according to this application.
Figure 5:
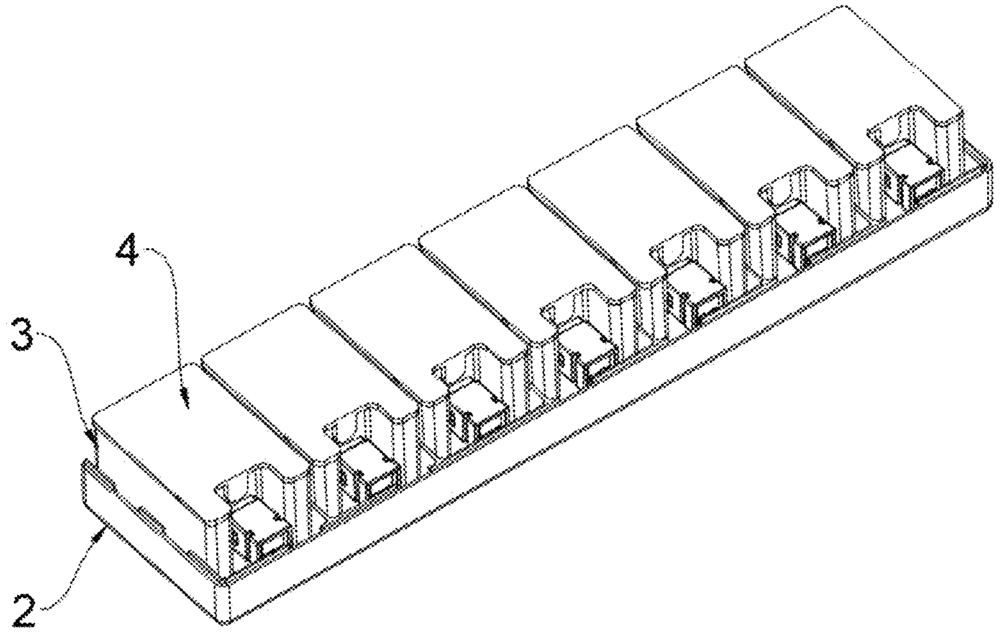
FIG. 5 is a schematic structural diagram of a silicone inner cover according to this application.

Referring to FIGS. 2 and 4, in this embodiment, an upper end of each plastic drawer 3 is provided with a silicone inner cover 4, a rear end of the silicone inner cover 4 is provided with a snap-fit block 14, a rear end of the plastic drawer 3 is provided with a snap-fit hole 15 for accommodating the snap-fit block 14, and the silicone inner cover 4 is snap-fitted with the plastic drawer 3 via an engagement between the snap-fit block 14 and the snap-fit hole 15. The snap-fitted sealing between the silicone inner cover 4 and the plastic drawer 3 can effectively prevent moisture from infiltrating into the plastic drawer 3, thereby maintaining the dryness of the medicine, and preventing it from deteriorating, thus ensuring excellent moisture-resistant performance. A front edge of an inner side of the lower bottom 2 is provided with a plurality of protrusions 12. Each plastic drawer 3 corresponds to two of the protrusions 12. A lower end of the plastic drawer 3 is provided with a pair of chutes 16 for accommodating the protrusions 12 corresponding to the plastic drawer 3, and the plastic drawer 3 is slidably provided along the inner side of the lower bottom 2. When the plastic drawer 3 slides to a tail end 21 of the lower bottom 2, the plastic drawer 3 is blocked by corresponding protrusions 12 in the lower bottom 2. The block design ensures compact sliding status between the lower bottom 2 and the plastic drawer 3, preventing excessive sliding of the plastic drawer 3 from causing detachment, thus making the medicine taking convenient.

Referring to FIGS. 2, and 4 to 6, in this embodiment, the rear end of the plastic drawer 3 is further provided with a locking joint 5 located below the snap-fit hole 15. A rear edge of the inner side of the lower bottom 2 is provided with a plurality of lock assemblies 30 that correspond one-to-one with the locking joints 5 on the plurality of plastic drawers 3. The lock assembly 30 is configured to clamp the locking joint 5 when the plastic drawer 3 is pushed into the lower bottom 2, so as to fix the plastic drawer 3 to the lower bottom 2. In this embodiment, the lock assembly 30 includes a built-in lock sleeve 6, a snap-fit case 7, a built-in lock pliers 8, a clasp machine bracket 9, and a spring 10. The built-in lock pliers 8 is provided in the built-in lock sleeve 6. The built-in lock pliers 8 is used to clamp the locking joint 5, so as to fix the plastic drawer 3 to the lower bottom 2. The snap-fitted design of the built-in lock pliers 8 ensures the plastic drawer 3 is not opened or closed accidentally, preventing the medicine from being scattered or missing and the plastic drawer 3 from detaching. The snap-fit case 7 is sleeved on the built-in lock pliers 8, the clasp machine bracket 9 is disposed in the built-in lock pliers 8, the spring 10 is disposed outside the clasp machine bracket 9 in the built-in lock pliers 8, and an inner side of the spring 10 is provided with spring damping. In the press-type spring compartment pillbox 100, with the arrangement of the spring 10 and a lock cylinder (such as a combination of the built-in lock pliers 8 and the clasp machine bracket 9), during no use, the plastic drawer 3 is locked in a box formed by the upper cover 1, the lower bottom 2, and the baffle 13. The plastic drawer 3 is sealed by the silicone inner cover 4, to provide anti-drop and dust-proof effects for the medicine to be stored, thus protecting the medicine from being damaged. During use, the plastic drawer 3 only needs to be pressed to pop out automatically, resulting in simple operation and convenient use.

Figure 3:
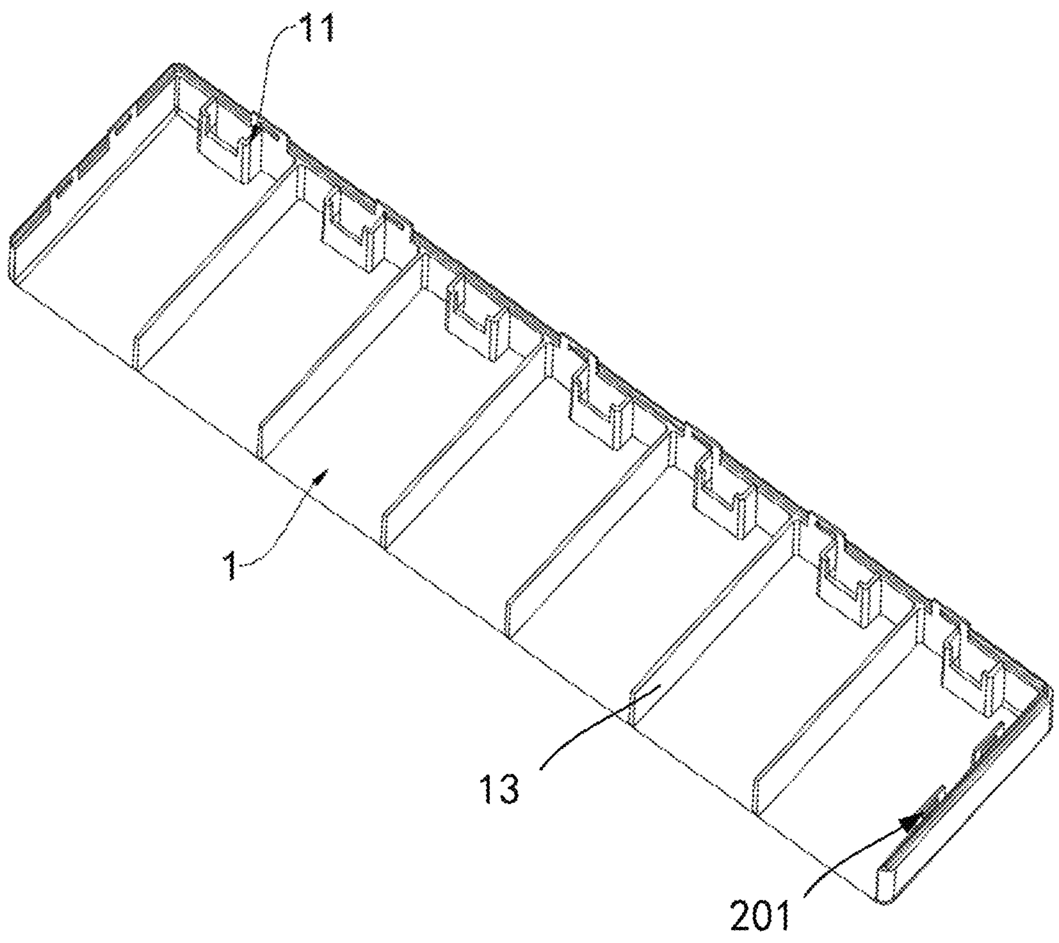
FIG. 3 is a schematic structural diagram of a limit bracket according to this application.
Figure 6:
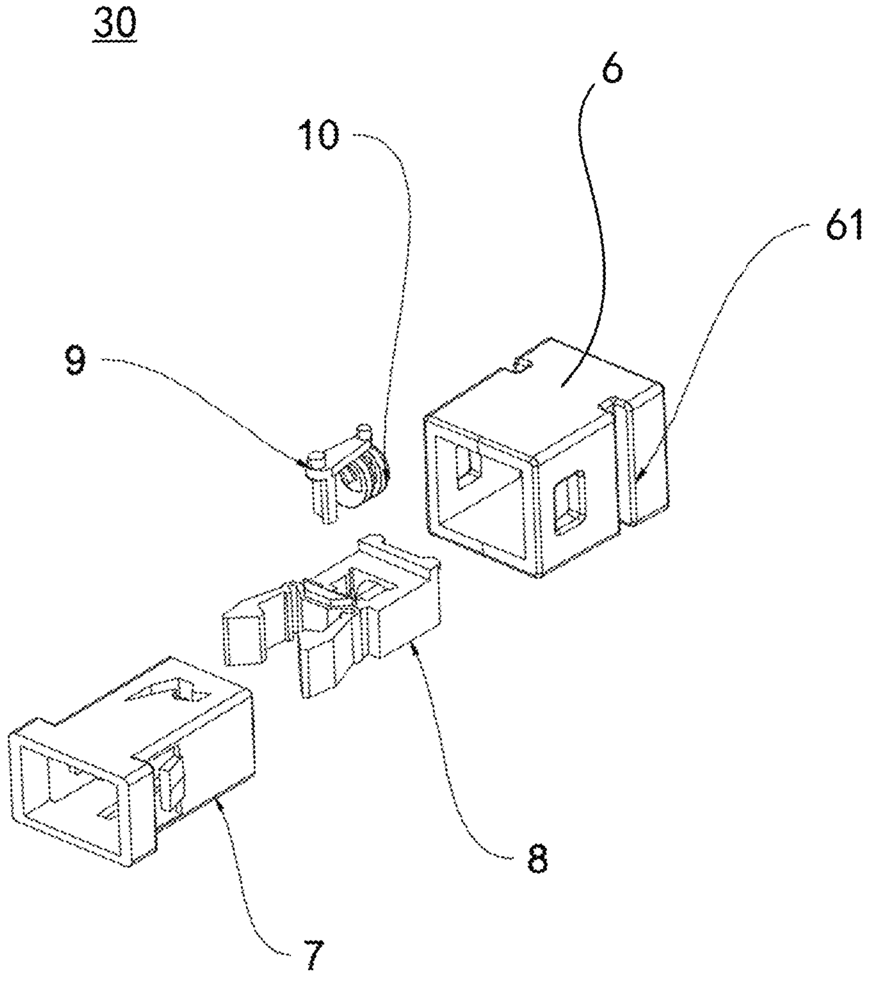
FIG. 6 is a schematic structural diagram of a lock assembly according to this application.

Referring to FIGS. 3 and 6, in this embodiment, an outer surface of the built-in lock sleeve 6 is provided with a positioning slot 61, an inner wall of the upper cover 1 is provided with a limit bracket 11 that matches the positioning slot 61, and the built-in lock sleeve 6 is snap-fitted with the upper cover 1 via an engagement between the positioning slot 61 and the limit bracket 11. The limit bracket 11 being snap-fitted into the positioning slot 61 avoids the built-in lock sleeve 6 vibrating, ensuring the compact fitting between the built-in lock sleeve 6 and the upper cover 1 and preventing the built-in lock sleeve 6 from detachment under an external force, thus enhancing the overall stability of the pillbox 100. Referring to FIGS. 2 and 3, a lower end of the upper cover 1 is provided with a snap-fit plate 101, an upper end of the lower bottom 2 is provided with a connecting slot 201 for accommodating the snap-fit plate 101. The lower bottom 2 is further provided with a fixed block 202 located in the connecting slot 201, and the upper cover 1 is snap-fitted with the lower bottom 2 via an engagement between the snap-fit plate 101 and the fixed block 202 in the connecting slot 202, thereby effectively preventing dust and impurities from entering the pillbox 100, thus maintaining the cleanliness of the medicine.

During operation, after the medicine to be stored is placed in the plastic drawer 3, the plastic drawer 3 is pushed manually to slide along the inner side of the lower bottom 2. When the plastic drawer 3 slides to the tail end 21 of the lower bottom 2, the plastic drawer 3 is blocked by the protrusion 12 in the lower bottom 2. When the consumer takes the medicine, the plastic drawer 3 is stopped at ⅔ of the pulling distance, ensuring the compact sliding status between the lower bottom 2 and the plastic drawer 3, thus preventing excessive sliding of the plastic drawer 3 from causing detachment. Each plastic drawer 3 is provided with a silicone inner cover 4. The snap-fitted sealing between the silicone inner cover 4 and the plastic drawer 3 via the engagement between the snap-fit block 14 and the snap-fit hole 15 can prevent moisture and dust from infiltrating into the plastic drawer 3, maintaining the dryness of the medicine, and preventing it from deteriorating, thus achieving dust-proof moisture-resistant function of the compartment pillbox 100.

When the plastic drawer 3 is pushed into the lower bottom 2, the locking joint 5 at the rear end of the plastic drawer 3 is inserted into the snap-fit case 7. The built-in lock pliers 8 in the snap-fit case 7 clamps the locking joint 5, so as to fix the plastic drawer 3 to the lower bottom 2, ensuring the plastic drawer 3 is not opened or closed accidentally, thus preventing the medicine from being scattered or missing and the plastic drawer 3 from detaching. Before the built-in lock sleeve 6 is mounted, the limit bracket 11 is snap-fitted into the positioning slot 61 to fix the built-in lock sleeve 6 with the upper cover 1, ensuring the compact fitting between the built-in lock sleeve 6 and the limit bracket 11 and preventing the built-in lock sleeve 6 from detachment under an external force. When the medicine needs to be taken, the plastic drawer 3 is pressed again, and the spring 10 bounces back to release the clasp machine bracket 9. The built-in lock pliers 8 loosens the locking joint 5, such that the plastic drawer 3 can slide again in the lower bottom 2 for medicine taking, so as to take the medicine form the lockable compartment pillbox 100 by pressing the spring 10.

Through the foregoing steps, with the arrangement of the spring 10 and a lock cylinder, during no use, the plastic drawer 3 is locked in a box, and the plastic drawer 3 is sealed using the silicone inner cover 4, to provide anti-drop and dust-proof effects for the medicine to be stored, thus protecting the medicine from being damaged. During use, the plastic drawer 3 only needs to be pressed to pop out automatically and is triggered for snap-fitting via a press, allowing for convenient opening and closing. In addition, the silicone inner cover 4 is snap-fitted with and sealed with the plastic drawer 3 via the snap-fit block. This can effectively prevent moisture from infiltrating into the pillbox, maintaining the dryness of the medicine, and preventing it from deteriorating, thus ensuring excellent moisture-resistant performance. When the plastic drawer 3 slides to the tail end 21 of the lower bottom 2, it is blocked by the protrusion 12 in the lower bottom 2. The block design ensures compact sliding status between the pillbox and the plastic drawer 3, preventing excessive sliding of the pillbox from causing detachment, thus making the medicine taking convenient. With the arrangement of the mechanical structure, the snap-fitting design of the spring 10 on the basis of the plastic member significantly improves the overall external appearance and practical functionality of the product.

The above has described the implementations of this application in detail with reference to the accompanying drawings. However, this application is not limited to the above implementations. Within the knowledge scope of those skilled in the art in this field, various changes can be made without departing from the purpose of this application.

What is claimed is:

1. A moisture- and dust-proof lockable press-type spring compartment pillbox, comprising:

an upper cover;

a lower bottom provided below the upper cover; and a plurality of plastic drawers, wherein the plastic drawers are provided between the upper cover and the lower bottom; the plastic drawers are compartmentalized, and a baffle is provided between two adjacent plastic drawers; an upper end of each plastic drawer is provided with a silicone inner cover; a rear end of each silicone inner cover is provided with a snap-fit block, a rear end of each plastic drawer is provided with a snap-fit hole for accommodating the snap-fit block, and each silicone inner cover is snap-fitted with the plastic drawer via an engagement between the snap-fit block and the snap-fit hole;

wherein each plastic drawer is slidably provided along an inner side of the lower bottom;

the rear end of each plastic drawer is further provided with a locking joint; a rear edge of the inner side of the lower bottom is provided with a plurality of lock assemblies that correspond one-to-one with the locking joints on the plurality of plastic drawers; each lock assembly comprises a built-in lock pliers, wherein each built-in lock pliers is configured to clamp the locking joint when the plastic drawer is pushed into the lower bottom, so as to fix the plastic drawer to the lower bottom.

2. The moisture- and dust-proof lockable press-type spring compartment pillbox according to claim 1, wherein a front edge of the inner side of the lower bottom is provided with a plurality of protrusions; each plastic drawer corresponds to two of the protrusions; a lower end of the plastic drawer is provided with a pair of chutes for accommodating the protrusions corresponding to the plastic drawer; wherein when each plastic drawer slides to a tail end of the lower bottom, the plastic drawer is blocked by corresponding protrusions in the lower bottom.

3. The moisture- and dust-proof lockable press-type spring compartment pillbox according to claim 1, wherein the locking joint on the rear end of the plastic drawer is located below the snap-fit hole.

4. The moisture- and dust-proof lockable press-type spring compartment pillbox according to claim 1, wherein the lock assembly further comprises:

a built-in lock sleeve, wherein each built-in lock pliers is provided in the built-in lock sleeve;

a snap-fit case sleeved on each built-in lock pliers;

a clasp machine bracket disposed in each built-in lock pliers; and a spring disposed outside the clasp machine bracket in each built-in lock pliers, wherein an inner side of the spring is provided with spring damping.

5. The moisture- and dust-proof lockable press-type spring compartment pillbox according to claim 4, wherein an outer surface of the built-in lock sleeve is provided with a positioning slot, an inner wall of the upper cover is provided with a limit bracket that matches the positioning slot, and the built-in lock sleeve is snap-fitted with the upper cover via an engagement between the positioning slot and the limit bracket.

6. The moisture- and dust-proof lockable press-type spring compartment pillbox according to claim 1, wherein a lower end of the upper cover is provided with a snap-fit plate, an upper end of the lower bottom is provided with a connecting slot for accommodating the snap-fit plate; the lower bottom is further provided with a fixed block located in the connecting slot, and the upper cover is snap-fitted with the lower bottom via an engagement between the snap-fit plate and the fixed block.

* * * * *